United States Patent
Herrick

(10) Patent No.: US 11,719,375 B1
(45) Date of Patent: Aug. 8, 2023

(54) PULLEY BURSTING HEAD

(71) Applicant: RODDIE, INC., Columbia Falls, MT (US)

(72) Inventor: Rod Herrick, Whitefish, MT (US)

( * ) Notice: Subject to any disclaimer, the term of this patent is extended or adjusted under 35 U.S.C. 154(b) by 0 days.

(21) Appl. No.: 17/392,082

(22) Filed: Aug. 2, 2021

Related U.S. Application Data

(60) Provisional application No. 63/064,117, filed on Aug. 11, 2020.

(51) Int. Cl.
| *F16L 55/18* | (2006.01) |
| *F16L 55/165* | (2006.01) |
| *F16L 55/40* | (2006.01) |

(52) U.S. Cl.
CPC ............ *F16L 55/1658* (2013.01); *F16L 55/18* (2013.01); *F16L 55/40* (2013.01)

(58) Field of Classification Search
CPC ....... F16L 55/1658; F16L 55/18; F16L 55/26; F16L 55/30; F16L 55/40
USPC ...................................... 405/184.3
See application file for complete search history.

(56) References Cited

U.S. PATENT DOCUMENTS

| | | | | |
|---|---|---|---|---|
| 5,192,165 A | * | 3/1993 | Torielli | E21B 7/30 405/184 |
| 5,876,152 A | * | 3/1999 | Hesse | E21B 7/30 405/184 |
| 6,305,880 B1 | * | 10/2001 | Carter | F16L 55/1658 405/184.3 |
| 6,357,967 B1 | | 3/2002 | Putnam | |
| 6,913,091 B2 | | 7/2005 | Wentworth et al. | |
| 8,414,225 B2 | | 4/2013 | Tjader et al. | |
| 8,784,009 B2 | | 7/2014 | Tjader et al. | |
| 2002/0081154 A1 | | 6/2002 | Herrick et al. | |
| 2007/0036613 A1 | * | 2/2007 | Tjader | F16L 55/1658 405/184.3 |
| 2008/0181728 A1 | | 7/2008 | Wentworth et al. | |
| 2010/0067988 A1 | * | 3/2010 | Tjader | F16L 55/1658 405/184.3 |
| 2012/0321391 A1 | | 12/2012 | Herrick et al. | |
| 2014/0037386 A1 | * | 2/2014 | Tjader | F16L 55/1658 405/184.3 |

OTHER PUBLICATIONS

"Guideline For Pipe Bursting", Jan. 2012, prepared for the International Pipe Bursting Association, a division of NASSCO, 11521 Cronridge Drive, Suite J, Owings Mills, MD 21117, USA.

* cited by examiner

*Primary Examiner* — Frederick L Lagman
(74) *Attorney, Agent, or Firm* — Robin Kelson Consulting, Inc.

(57) ABSTRACT

Disclosed is a bursting head device or tool whose interior accommodates a pulley system competent to engage a pulling cable. The pulley can comprise a wheel on an axle or shaft designed to support movement and change of direction of the pulling cable and can include a groove or channel around its circumference to locate the cable. The improved bursting head device is competent to increase the effective pulling force or capacity of a bursting head pulling machine and can increase the machine's effective range of replacement pipe diameters.

1 Claim, 5 Drawing Sheets

PULLEY BURSTING HEAD

CROSS REFERENCE TO RELATED APPLICATIONS

This application claims the benefit of Provisional Application No. 63/064,117, filed Aug. 11, 2020, the disclosure of which is hereby expressly incorporated in its entirety by reference herein.

FIELD OF USE

Embodiments of the present disclosure find applicability in the field of trenchless pipe bursting. One useful field includes the field of underground pipe replacement, such as the replacement of water, sewer, gas or other underground pipes.

BACKGROUND

Pipe bursting is a recognized trenchless technology of choice for replacing failing and under capacity pipelines, including underground service utility pipelines. Pipe bursting is defined as a trenchless replacement method in which an existing underground pipe is broken by brittle fracture or splitting, using an internal mechanically applied force applied by a bursting tool known in the art as a bursting head. The bursting head typically has a cone-like shape, with the leading or nose end generally smaller in diameter than the existing pipe, and the base or back end being larger than the inside diameter of the pipe so that, as the bursting head is pulled through the existing pipe it fractures or "bursts" the pipe. At the same time, a new pipe, typically of the same or larger diameter, is pulled in, replacing the existing pipe. The back end of the bursting head is attached to the new pipe, often by means of a universal duct puller, and the bursting head front end is connected to a cable or pulling rod.

Cable attachment to the bursting head typically can be through an external connection to the bursting head nose end, or by means of a clamping mechanism internal to the cone body of the bursting head. The bursting head and new pipe are launched from an insertion point or "pit", and the cable is pulled from a receiving/extraction point or "pit". Typically, the cable and attached bursting head are pulled from the insertion point towards the receiving point by means of a hydraulic pulling machine that may be electrical or gas-powered.

It is an on-going desire in the industry to provide fast, efficient and stable cable pulling devices that have few components to transport, are reasonably lightweight, are small in size, are easy to set up and use in the field, and which also require minimal pit size excavation to install. It also is an on-going desire to provide these characteristics at a reasonable cost to the consumer, in a range of pulling force capabilities, including in the range of at least about 30-100 tons, and for pulling a range of pipe diameters, using a range of cable sizes.

Useful cable pulling and replacement pipe pulling apparatuses in the art that have value in residential and commercial pipe replacement typically utilize a hydraulically powered cylinder or piston mechanism, also known in the art as a ram puller mechanism, to pull the cable. Cable pulling systems in the art can utilize a dual cylinder piston assembly to provide the desired pulling forces typically required to pull replacement pipes having diameters in the range of 2-12 inches. Useful pulling forces for this range of pipe diameters can be in the range of about 30-100 tons.

Piston-driven cable pulling apparatuses in the art also can comprise a horizontal system, where the ram puller mechanism is parallel to the ground and the cable being pulled, or a vertical system, where the ram puller mechanism is vertical to the ground and the cable being pulled through pipe. Typically the cable being pulled is angled into a vertical position by means of a pulley wheel or similar mechanism and then engaged with the ram puller mechanism.

While pulling forces in the range of up to about 30 tons work well for small pipe diameter pipe bursting, e.g., in the range of 2-inches to 6-inches, pipe bursting using larger diameter pipe, such as 8-inch to 12-inch diameter pipe, benefits from higher pulling forces, in the range of at least about 60-80 tons. In addition, pipe bursting and pulling larger diameter pipe can benefit from using larger cable diameters than those required to pull/burst pipes with a small diameter range (e.g., 2-6 inches). Many of the pulling machines built to accommodate pulling forces in the range of about 30 tons also have a maximum cable diameter that can be accommodated. Thus, for an operator seeking to burst pipe larger than 6-inch diameter pipe, it can mean utilizing a larger pulling machine to provide larger cable and greater pulling forces. Having multiple pulling machines can be costly, and larger machines have the disadvantage of being bigger, heavier, and more cumbersome to maneuver, generally.

The present disclosure describes improvements in the bursting head tool and methods of use thereof that allow an operator to increase and even effectively double the pulling force of a pipe bursting pulling machine and expand the pipe bursting diameter range of the machine.

SUMMARY

This summary is provided to introduce a selection of concepts in a simplified form that are further described below in the Detailed Description. This summary is not intended to identify key features of the claimed subject matter on its own, nor is it intended to be used on its own as an aid in determining the scope of the claimed subject matter.

In accordance with one embodiment of the disclosure, provided herein is a novel bursting head device or tool. The device comprises a bursting head, typically conically-shaped, and whose interior accommodates a pulley competent to engage a pulling cable. In one preferred embodiment the pulley comprises a wheel on an axle or shaft designed to support movement and change of direction of the pulling cable and it includes a groove or channel around its circumference to locate the cable.

In another embodiment the pulley is competent to increase the effective pulling force or capacity of a bursting head pulling machine. In still another embodiment, the pulley bursting head can effectively double the pulling force of a bursting head pulling machine. In still another embodiment, the pulley bursting head is competent to increase the bursting pipe diameter range for a given pipe bursting pulling machine. In yet another embodiment, the pulley bursting head is competent to increase the bursting head size a pulling machine can accommodate and/or the effective pulling force of a pulling machine without requiring a larger diameter cable than the pulling machine's allowable maximum diameter.

In one embodiment, the pulley can be located in the interior of a substantially hollow cone body. In another embodiment, the cone body can be constructed to include a pulley as part of its internal structure.

These and other attendant features and aspects of the present disclosure will be apparent from the drawings, detailed description and claims which follow.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Embodiments of the present disclosure provide devices, tools, components, mechanisms and methods of use directed to improved means for bursting pipe underground, particularly degraded or under-capacity pipe.

The pulley bursting head of the present disclosure provides a novel solution for increasing the pipe bursting capacity of a given pipe bursting pulling machine. The device allows an operator to increase the pipe bursting diameter range of her/his pulling machine without requiring larger cable diameter or substantive modification to the pulling machine's pulling force capabilities.

Figure 1:
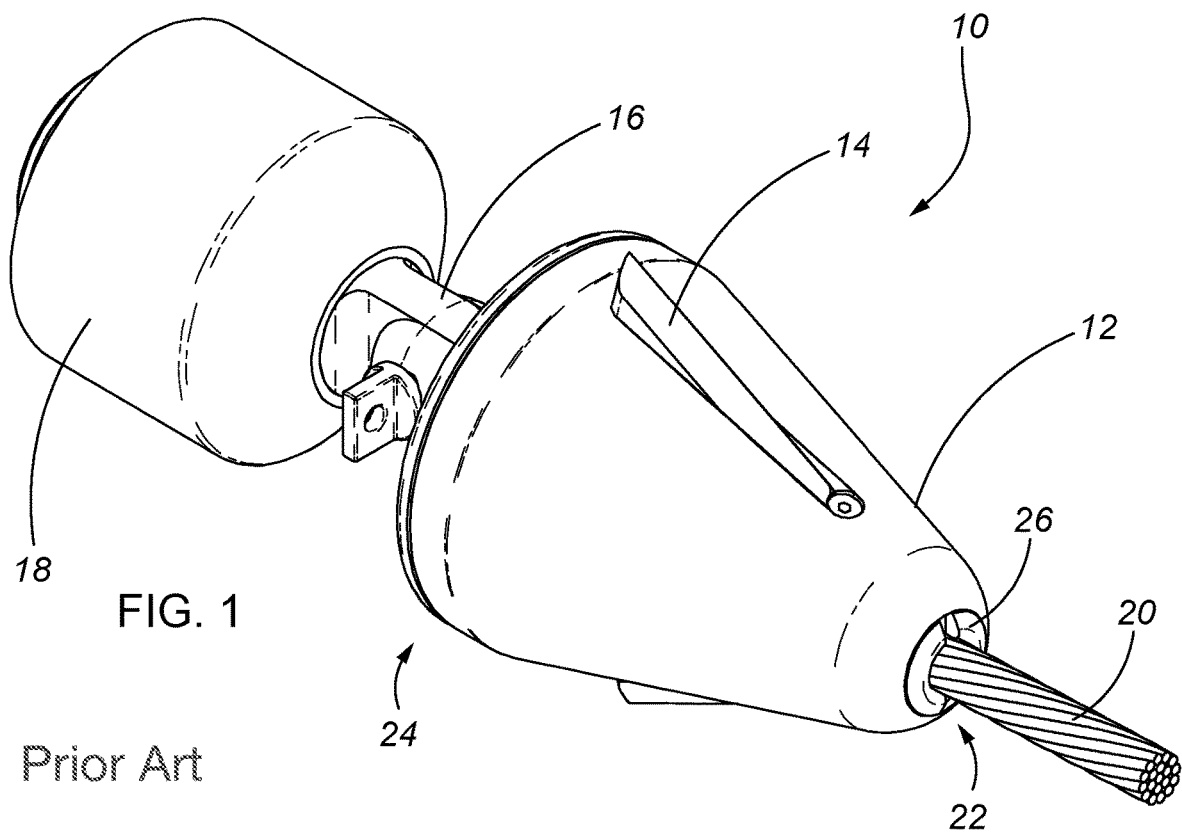
FIG. 1 illustrates a prior art bursting head.

Referring to FIG. 1, a representative bursting head tool or device of the prior art is shown. In the figure, bursting head tool 10 has a cone body 12, having a substantially conical shape with a front or "nose end" 22 of a smaller diameter than the diameter of back end 24. The cone body optionally can include one or more cutting blades 14 on its outer surface to support fracturing the existing pipe through which bursting head device 10 is being pulled through. The back end of bursting head 10 can include a linkage 16 connecting device 10 to replacement pipe being pulled through together with bursting head 10. Typically the replacement pipe is coupled to bursting head 10 via a universal duct puller 18 or similar structure. The free end of a pulling cable 20 typically is attached to the front end of bursting head 10 in the devices of the art, either by an external linkage or, as in FIG. 1, by means of an internal clamping mechanism that secures the free end of cable 20 to the device and cable 20 extends out from a single nose end aperture 26 of cone body 12.

Figure 2:
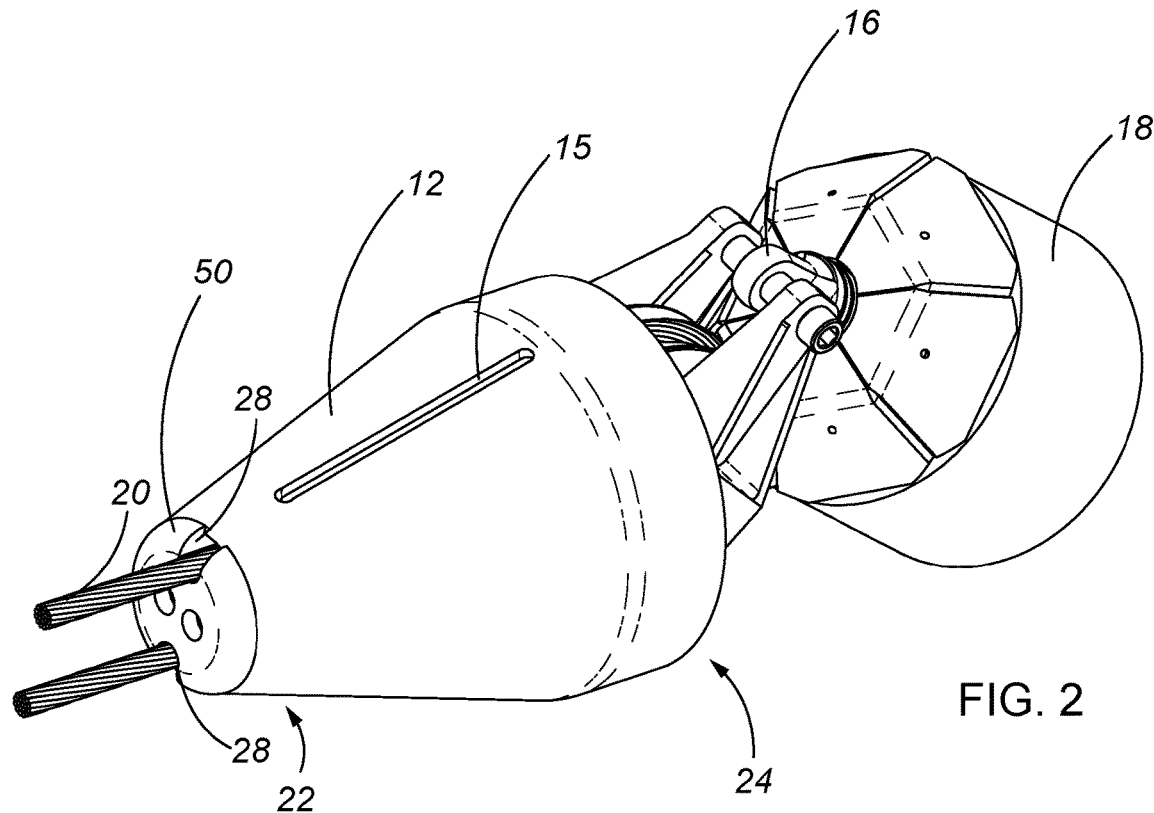
FIG. 2 illustrates a bursting head according to one embodiment of the instant disclosure.

Referring to FIGS. 2-8, bursting head device 10 can include a cone body 12 that houses an internal pulley mechanism competent to locate cable 20 in a channel or groove 32 and reverse cable 20's direction. Nose end 22 of cone body 12 can include two apertures 28 to accommodate cable 20 entering and exiting cone body 12. Highlighted in FIGS. 2, 3 and 8 in particular, apertures 28 can comprise part of a front cap 50 that attaches to cone body 12. As with bursting head devices in the art, cone body 12 also can include means for accommodating one or more splitting blades on the cone body 12 outer surface. FIG. 2 illustrates a groove 15 into which a splitting blade can be fitted, if desired.

Figure 3:
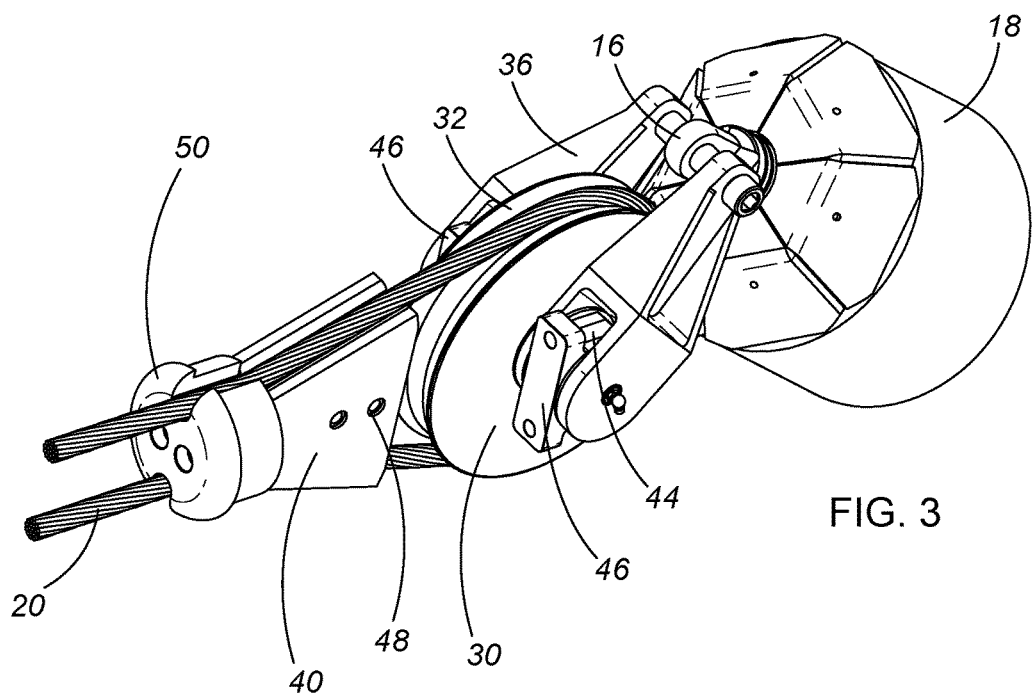
FIG. 3 illustrates a pulley bursting head mechanism according to one embodiment of the instant disclosure.
Figure 4:
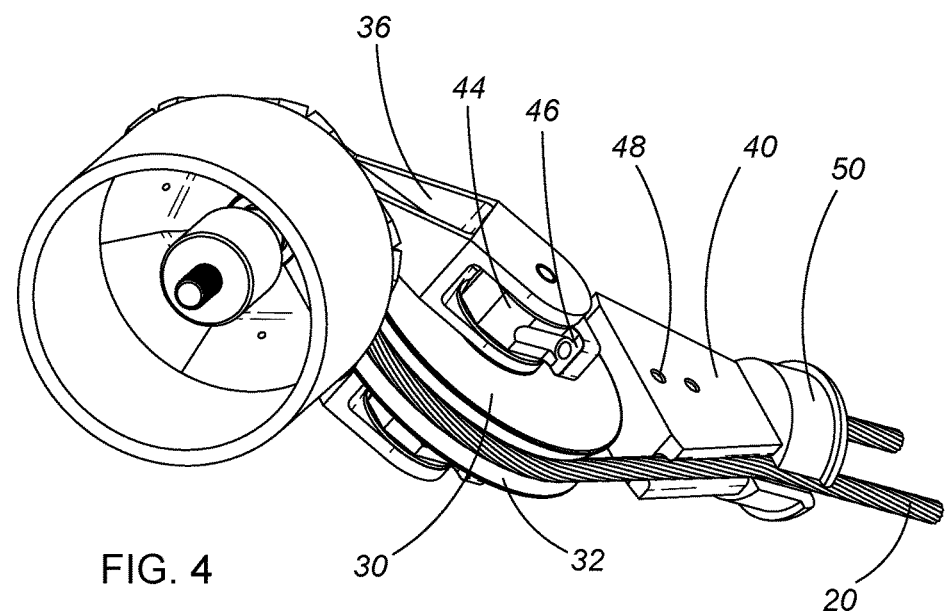
FIG. 4 illustrates a pulley bursting head mechanism according to one embodiment of the instant disclosure.
Figure 5A:
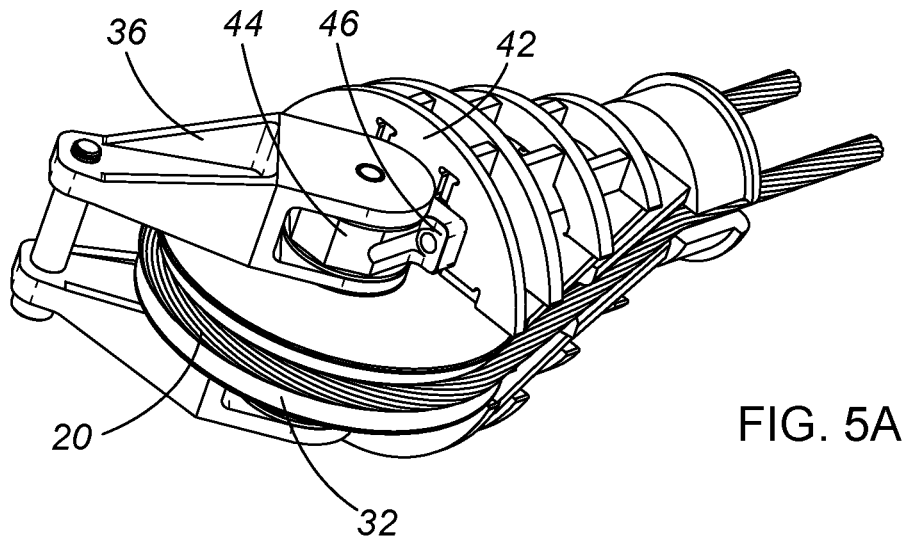
FIG. 5 illustrates a pulley bursting head mechanism according to one embodiment of the instant disclosure.
Figure 5B:
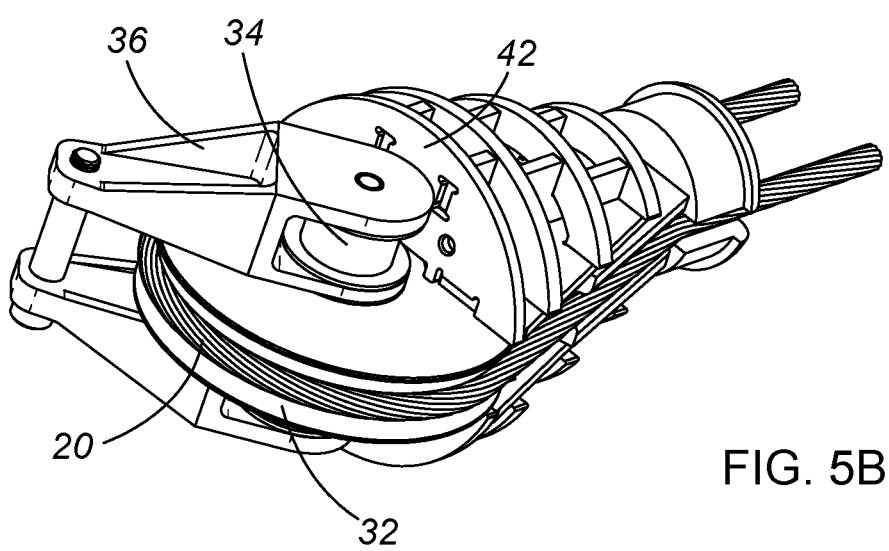
Figure 6:
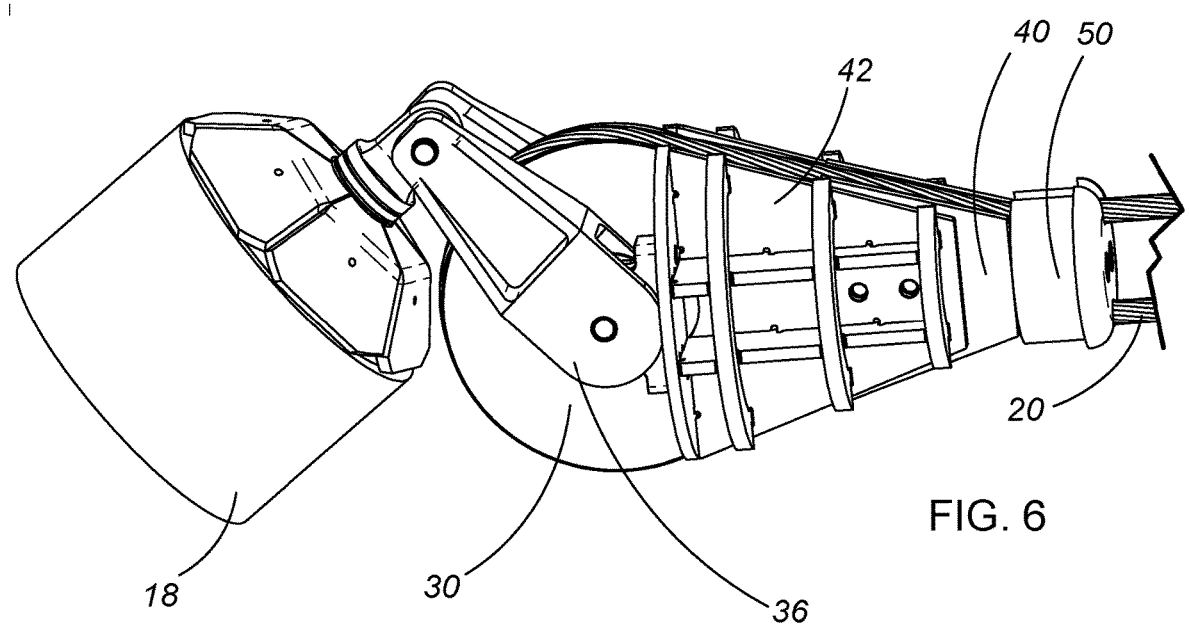
FIG. 6 illustrates a pulley bursting head mechanism according to one embodiment of the instant disclosure.
Figure 7:
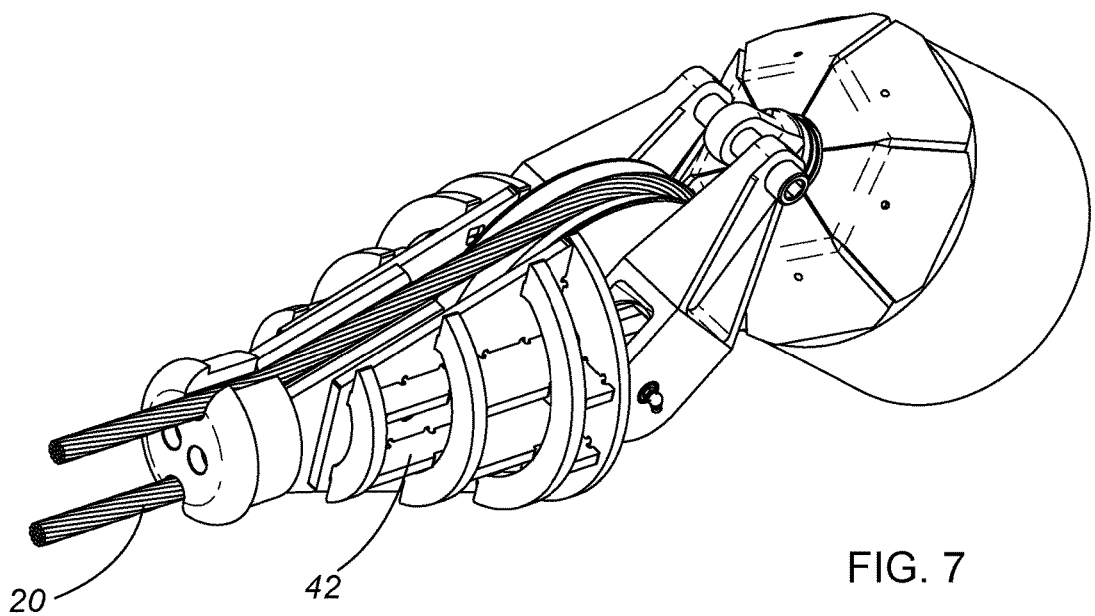
FIG. 7 illustrates a pulley bursting head according to one embodiment of the instant disclosure.
Figure 8:
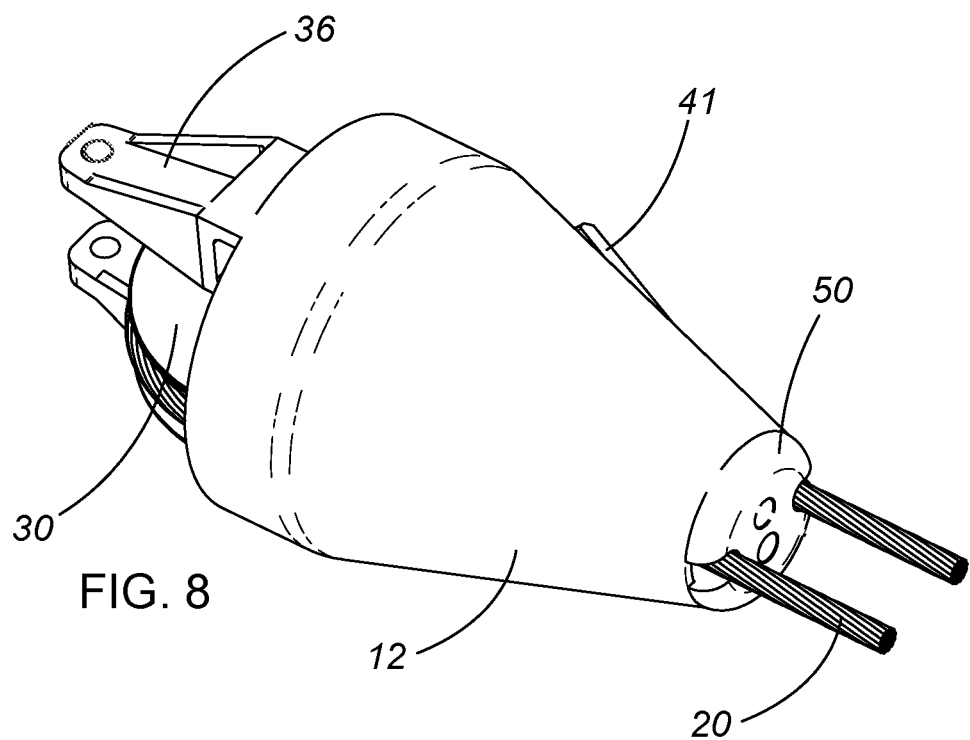
FIG. 8 illustrates a pulley bursting head according to one embodiment of the instant disclosure.

FIGS. 3-5 illustrate one representative useful pulley mechanism that may be used to advantage. In the figures, pulley wheel 30 includes a groove or channel 32 that accommodates and locates cable 20 as the cable travels around wheel 30. Wheel 30 is on an axle or shaft 34 that supports movement and change of cable direction as wheel 30 rotates about shaft 34, and cable 20 is the pulley system or pulley mechanism drive element. If desired, wheel 30 also can include one or more weight-reducing gaps, holes or cut-outs 38.

In the figures axle 34 and wheel 30 is held between pulley blocks 36. In the figures blocks 36 connect the pulley mechanism and attached cone body 12 to linkage means 16 that couple bursting head device 10 to the replacement pipe.

In the embodiment illustrated in the figures, pulley wheel 30 in placed in a hollow interior of cone body 12, and can include any useful means for securing the pulley system or mechanism to the cone body. Exemplary, illustrative components include cable channel extender 40, configured with a channel 32 to accommodate, locate and guide cable 20 across the distance between front cap 50 and pulley wheel 30. A filler component 42 also can be provided that at least partially fills the available space of the cone body interior not occupied by the pulley mechanism.

In FIGS. 5-8, filler component 42 comprises two ribbed or strut-like structures that are attached by standard means to opposing sides of pulley wheel 30 and extender 40 such that the composite structure has an overall conical shape dimensioned to substantially mirror and fill the conical interior cavity of cone body 12. In the figures an axle housing 44 encases axle 34 and provides means for connecting wheel 30 and block 36 to filler component 42 by filler attachment means 46. Similarly, filler component 42 can be attached to extender 40 by any standard means including, for example, bolting means 48.

It will be appreciated by those having skill in the art that the embodiments illustrated here are exemplary and that, provided with the instant disclosure, a range of means for constructing a bursting head with an internal cable pulley system or mechanism now can be fabricated by one of ordinary skill in the art without undue experimentation. For example, a bursting head cone body could be machined to create a pocket into which a pulley wheel could be inserted and the axle shaft attached to the cone body interior itself, or to a block that attaches to the cone body interior or directly to linkage 16.

In operation, the pulling machine is located at the extraction or receiving point, preferably positioned so cable pulling action is in alignment with the existing pipe cavity. A cable free end is provided through the pipe cavity to the insertion point where the bursting head device and attached replacement pipe are located, and the free end provided through the cone body nose end opening, around the pulley wheel, back out the nose end, and provided back through the pipe cavity to the extraction or receiving point. Preferably, means are provided on the pulling machine or, more preferably on a crib in which the machine sits, or at some other location at the receiving point, for anchoring the cable free end. The anchoring means can include a cable clamping means analogous to the cable gripping means used by the pulling machine, including means that provide a modulatable gripping and release means common to pulling machines. As the pulling machine pull the attached cable towards the receiving point, the bursting head and attached replacement pipe are pulled forward through the pipe.

The pulley bursting head allows the machine to double its effective pulling power. In the case of a piston-driven pulling machine, each piston stroke now moves half the cable distance, which can effectively double the power. Pulling machines that operate well in the 30-40 ton pulling force range generally have an operational pipe diameter cap of about 6-inches. Using the pulley bursting head device, the effective pulling capacity of the machine now can be doubled, in the range of about 60-80 tons, which can expand operational pipe diameter cap to include 8, 10 and 12-inch diameter pipe.

Embodiments of this disclosure may be embodied in other specific forms without departing from the spirit or essential characteristics thereof. The present embodiments are therefore to be considered in all respects as illustrative and not restrictive, the scope of the disclosure being indicated by the appended claims rather than by the foregoing description, and all changes that come within the meaning and range of equivalency of the claims are therefore intended to be embraced therein. While illustrative embodiments have been illustrated and described, it will be appreciated that various changes can be made therein without departing from the spirit and scope of the disclosure.

The embodiments of the invention in which an exclusive property or privilege is claimed are defined as follows:

1. A bursting head device dimensioned to burst a pipe when pulled through said pipe by a cable, comprising:
   a cone body having an anterior and posterior end, an interior cavity and an anterior aperture through which said cable can enter and exit said cavity, and
   a pulley wheel located in said cone body interior cavity and comprising a groove around the external circumference of said wheel dimensioned to locate said cable, such that
   when said cable is located about said pulley wheel, one free end of said cable is attached to an external anchor point, the other end of said cable is attached to a pulling means, and said pulling means is engaged, said pulley wheel rotates about a central shaft and said bursting head device is pulled towards said pulling means.

\* \* \* \* \*